United States Patent
Jacobsen

(10) Patent No.: US 6,542,378 B2
(45) Date of Patent: Apr. 1, 2003

(54) FREQUENCY CONVERTER

(75) Inventor: John Bjerregård Jacobsen, Bjerringbrø(DK)

(73) Assignee: Grunfos A/S, Bjerringbro (DK)

( * ) Notice: Subject to any disclaimer, the term of this patent is extended or adjusted under 35 U.S.C. 154(b) by 0 days.

(21) Appl. No.: 09/799,303

(22) Filed: Mar. 5, 2001

(65) Prior Publication Data

US 2002/0021051 A1 Feb. 21, 2002

(30) Foreign Application Priority Data

Mar. 6, 2000 (DE) .......................... 100 10 919

(51) Int. Cl.⁷ ................................ H05K 1/11
(52) U.S. Cl. ................ 361/784; 361/774; 361/775
(58) Field of Search ................ 361/752, 753, 361/774, 775, 776, 784, 803; 174/254; 439/493

(56) References Cited

U.S. PATENT DOCUMENTS

| 4,458,305 | A | | 7/1984 | Buckle et al. ............... 363/141 |
| 5,132,877 | A | * | 7/1992 | Branan et al. ............... 361/736 |
| 5,410,450 | A | * | 4/1995 | Iida et al. ................... 174/52.4 |
| 5,471,089 | A | | 11/1995 | Nagatomo et al. .......... 257/691 |
| 5,675,223 | A | | 10/1997 | Yoshizawa et al. ......... 318/139 |
| 5,742,484 | A | * | 4/1998 | Gillette et al. ............ 174/106 R |
| 5,914,577 | A | | 6/1999 | Furnival ...................... 318/538 |
| 6,031,730 | A | * | 2/2000 | Kroske ........................ 361/784 |

FOREIGN PATENT DOCUMENTS

| DE | 196 49 798 | 6/1998 | ............ H01L/23/18 |
| DE | 197 51 109 | 5/1999 | ............ B29C/70/72 |
| EP | 0 936 729 | 5/1998 | ............. H02P/7/63 |
| WO | WO98/19389 | 5/1998 | ............. H02P/7/63 |

* cited by examiner

*Primary Examiner*—Kamand Cuneo
*Assistant Examiner*—Tuan Dinh
(74) *Attorney, Agent, or Firm*—Cohen, Pontani, Lieberman & Pavane

(57) ABSTRACT

The frequency converter for an electrical motor essentially consists of power part integrated in a common semiconductor component, of a component accommodating at least the intermediate circuit electronics and of a component accommodating the control and regulation electronics. The electrical connections from the semiconductor component of the power part to the intermediate circuit component and from the semiconductor component of the power part to the control and regulation component are formed by sheet metal connections which are positioned and mechanically connected to one another by way of a common cast body.

9 Claims, 3 Drawing Sheets

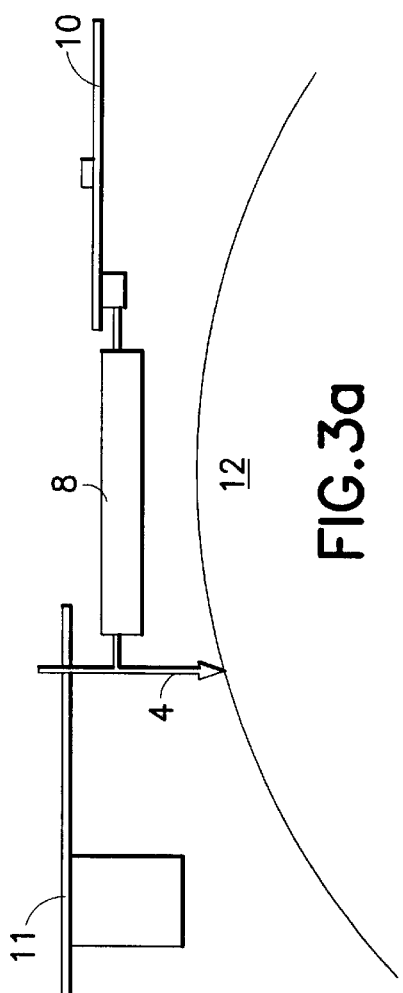
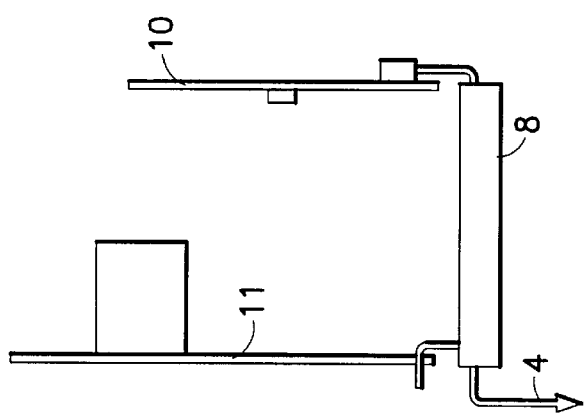
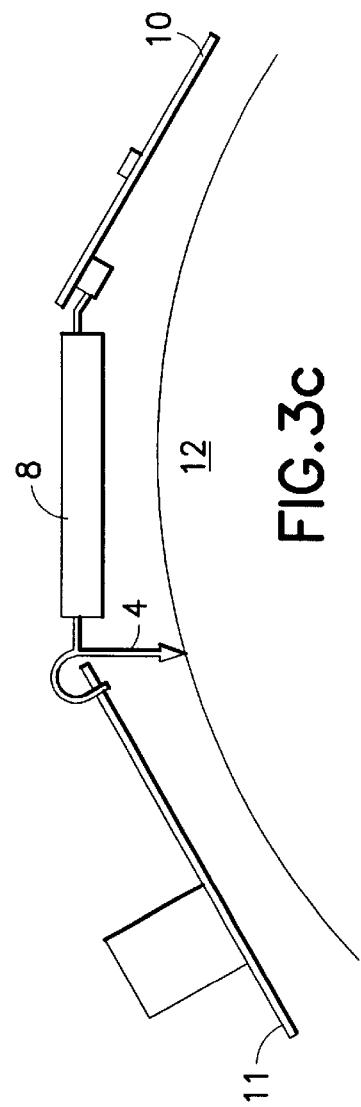

FREQUENCY CONVERTER

BACKGROUND OF THE INVENTION

1. Field of the Invention

The invention relates to a frequency converter for an electric motor having a power portion, an intermediate circuit component and a control and regulation component.

2. Description of the Prior Art

Frequency converters are, for example, applied for the drive of electric motors of pump units, fans and other machines. Freqequency converter applications typically were exclusively considered for motors of more than 1 KW. However, an increasing miniaturization of the frequency converter and the manufacture on a large scale now allows the application of frequency converters to motors in the region between 50 W and 1000 W to be economically practical. In particular with pump units the application of frequency converters is particularly advantageous since with this, pump units may be provided which in spite of a relatively small diameter realize a large delivery flow due to high rotational speed.

A submersible unit for such a pump unit is for example known from DE 197 27 202 A1. With such an arrangement all components of the frequency converter are to be accommodated within a cylindrical housing of a comparatively small diameter. In contrast however to other applications with which the axial and radial constructional length of the motor where possible is not to be increased, one seeks to arrange the components of the frequency converter in a flat manner on the outer periphery of the motor housing. Again with other applications the frequency converter where possible is to be accommodated in the terminal box of the motor, thus on the rectangular-parallelpiped-shaped housing. Furthermore the construction is to be modified for the respective application such that the waste heat arising in the power part may be reliably led away.

Since the manufacturing costs of such a frequency converter depend very heavily on the number of pieces to be manufactured, it is desirable for different applications to be able to apply the same components. It is known to divide up the frequency converter into components and to arrange these individual components for example in a circuit board manner. Functionally a frequency converter consists of an input circuit, of an intermedate circuit and of a power circuit—also called inverse rectifier—as well as of a control and regulation circuit. It is known to integrate the power circuit of the frequency converter into a semiconductor component or into a semiconductor element, to construct the input as well as the intermediate circuit on a common circuitboard as well as the control and regulation circuit on a further circuitboard. With this construction, particularly large construction components such as for example capacitors and coils of the intermediate circuit may be arranged separate from the circuitboard.

BRIEF SUMMARY OF THE INVENTION

This object is achieved according to the invention by a frequency coverter for an electric motor including a power part integrated in a common semiconductor component, an intermediate circuit component, and a control and regulation component. Each of the intermediate circuit component and the control and regulating component comprise a circuit board. Electric connections between the semiconductor component and the control and regulating component comprise a circuit board. Electric connections between the semiconductor component and circuit boards of the intermediate component and the control and regulation component are made via a plurality of sheet metal sections positioned and mechanically connected via a cast body of the power part, such that the sheet metal sections comprise leads of the power part.

The basic concept of the present invention is to integrate the lead connections and connections within the frequency converter where possible into one component, specifically into that of the power part—this comprises essentially the power circuit and where appropriate further power electronics such as for example the input circuit. For this the power part is particulary useful to be selected since the power part requires lead connections to the input circuit or to the mains supply, to the intermediate circuit, to the control and regulation circuit and to the motor. These electrical connections may all be integrated into one component, wherein the leads are formed of sheet metal sections, thus from punched sections which on the one hand are inexpensive to manufacture and on the other hand offer a high intrinsic stability and a sufficiently large conducting cross section. These leads lead directly to the circuitboards of the connection components, where they are contacted, be it by way of soldering or welding or also by way of a plug-and-socket connection. These components fixed together with the semiconductor component by way of a cast mass are inexpensive to manufacture, and specifically with a differing arrangement of the connections without having to change anything on the basic design construction. Simultaneously these additional design elements may be used for fastening the semiconductor component. The semiconductor component as a rule specifically requires an intensive cooling, which usually is effected by a heat conducting bearing of this onto a heat distributor. Via the cast body which either encompasses the semiconductor component on at least three sides or also encloses it, be it partly or completely, there may be effected a fastening, be it via clamping clips or screw closures, rivets or likewise, without mechanically overloading the semiconductor component.

The semiconductor component containing the power part is usually rectangular-parallelpiped-shaped and flat, wherein the lead connections are led out at the narrow end-faces. With such a construction it is particularly advantageous when the leads facing the intermediate circuit component are led out to one side of the cast body or of the semiconductor component, the leads facing the control and regulation component to the opposite distant side of the cast body and the leads facing the motor to a side displaced by 90° to this. Disregarding the fact that this arrangement permits a crossing-free leading of the leads, thus a leading of the leads in one plane, this arrangement has the advantage that the intermediate circuit component as well as the control and regulation component, according to application, may be arranged at a different angle to the power component. There may therefore for example be selected an arrangement with which these three components are adapted to the curvature on the outer periphery of a motor. By way of a bending-up about in each case 90° with respect to the power component there may also be achieved an arrangement which becomes essentially rectangular parallelpiped-shaped or is insertable into a cylindrical body. With a straight arrangement in contrast it will result in a two-dimensionally constructed frequency converter. Since the electrical connections leaving the power part are formed by sheet metal sections which usefully lie such that their flat sides lie parallel in the plane of the semiconductor component or parallel thereto, these may be bent up practically in any manner along the sides of the power part component. As long as they in this region are encompassed by the cast body only the cast mould it to be correspondingly adapted or the bending up to be carried out before the cast body is completely solidified.

BRIEF DESCRIPTION OF THE DRAWINGS

In the drawings, wherein like characters denote similar elements throughout the several views:

FIGS. 3a, 3b, and 3c are schematic diagrams showing three arrangement embodiments of the frequency converter according to the present invention.

DETAILED DESCRIPTION OF THE INVENTION

Figure 1:
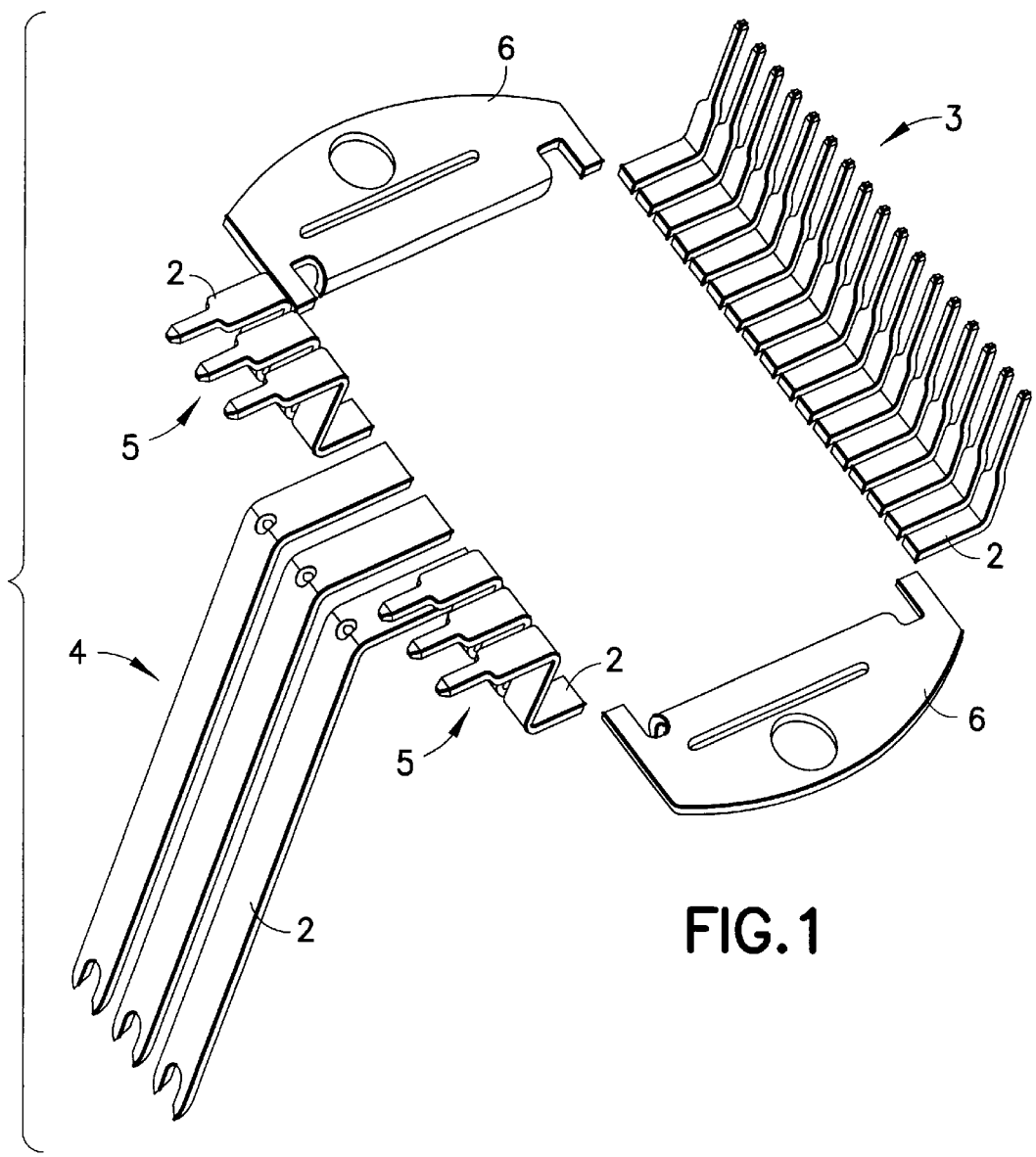
FIG. 1 is a perspective view showing the arrangement of sheet metal sections of a frequency converter according to the present invention without the cast body which mechanically interconnects them.
Figure 2:
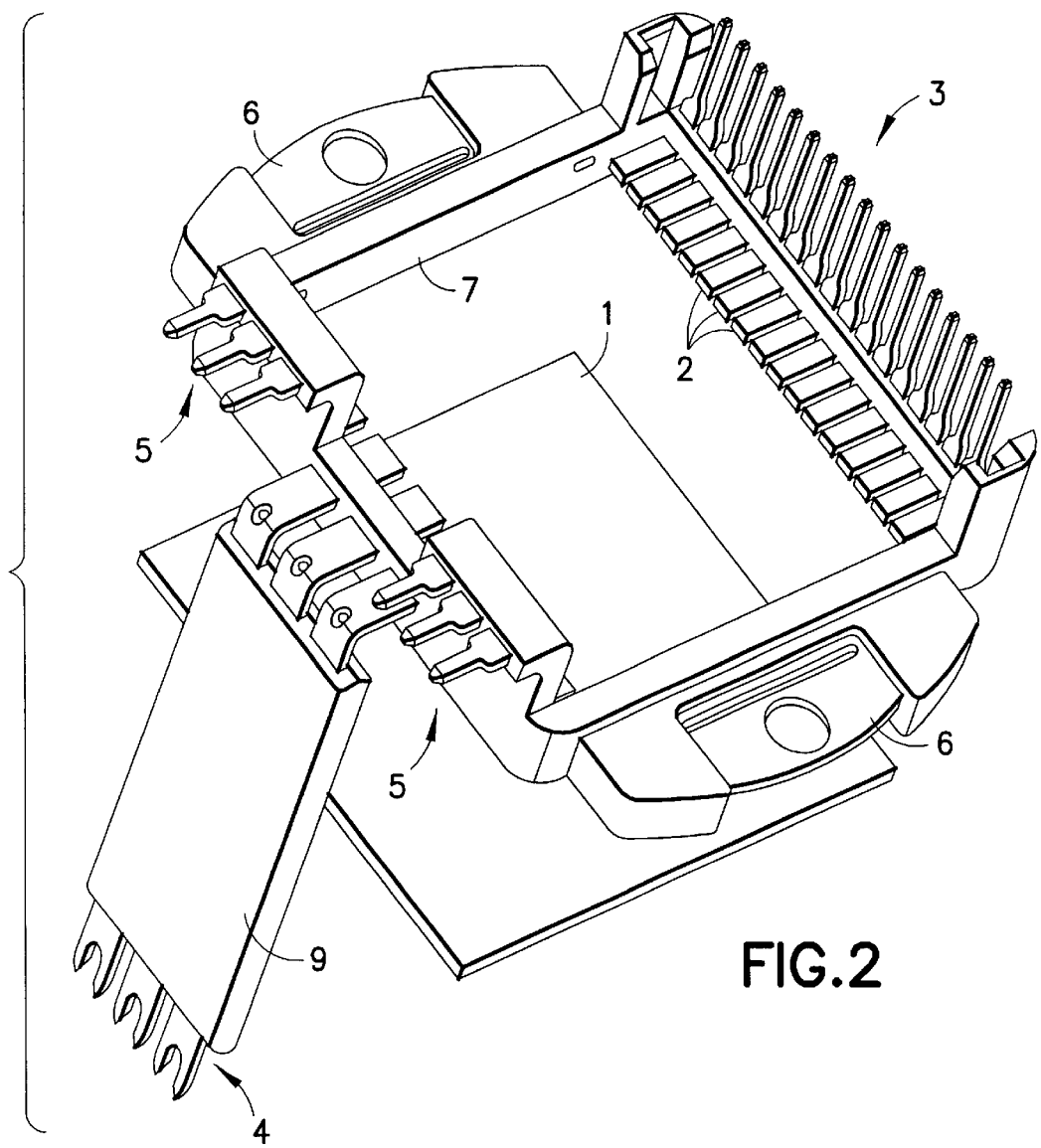
FIG. 2 is a perspective view of the arrangement of sheet metal sections in FIG. 1 with the cast body and a semiconductor which is insertable in the cast body.

A semiconductor element 1 shown schematically in FIG. 2 comprises the usual rectangular-parallelpiped and two-dimensional constructional shape usual for such integrated components, with which electrical connections in the form of thin wires (not shown) are led out laterally. The leads are connected by bonding, for example by ultrasound welding, to sheet metal sections 2 which have obtained the constructional shape and arrangement shown in the FIG. 1 by way of punching and cold-forming.

As is deduced from the FIGS. 1 and 2 the sheet metal sections 2 which simultaneously form electrical conductors are arranged in three groups. There is a first group 3 of in total eighteen sheet metal sections 2 which are bent up by about 90° and extend to one side of the semiconductor element 1. Lying opposite there is formed a second group 4 of sheet metal sections which consists of three sheet metal sections which likewise are bent up by about 90° out of the plane of the semiconductor element 1, but in the opposite direction to those of the first group 3. These sheet metal sections of the second group 4 furthermore have a greater length than those previously mentioned. A third group 5 which encloses the second group 4 of sheet metal sections 2, consists of a pair of three sheet metal sections which in each case are bent up twice by 90°, however in opposite diecrions, so that the free ends of the sheet metal sections of the third group 5 extend in a plane located parallel to the semiconductor element 1. Finally there are provided two sheet metal sections 6 which extend to the two other longitudinal sides of the semiconductor element and have a purely mechanical function.

The first, second and third groups 3, 4, 5 of sheet metal sections 2 as well as the two sheet metal sections 6 are positioned in a common cast body 7 and mechanically connected to one another. The cast body 7 encompasses in the shown embodiment the semiconductor element 1 on all four sides so that the semiconductor element 1 is incorporated and protected by the cast body 7 in a frame-like manner. The semiconductor element 1, the sheet metal sections 2, the two sheet metal sections 6 and the cast body form a power part component 8. The sheet metal sections 6 serve the fastening of the whole power part component 8 formed in this manner. The cast body 7 consisting of plastic is not electrically conducting.

The present embodiment also includes a further cast body 9 which encompasses a part of the sheet metal sections of the second group 4. This cast. body 9 holds the sheet metal sections embedded therein in their position to one another and insulates them simultaneously in this region from the surroundings. The second group 4 represents the connection leading to the motor which is to be activated by the frequency converter and therefore comprise power leads. As is deduced from FIG. 2 the free ends of the sheet metal sections 2 of the first and third groups 3 and 5 are designed in a slimline tapering manner so that they form the plug-side part of a plug-and-socket connection whose bushing-side part is arranged on circuitboards, and specifically on a circuitboard 10 shown schematically in FIGS., 3a, 3b, and 3c and forming the control and regulation component as well as on a circuitboard 11 accommodating the intermediate circuit which may also comprise parts of the input circuit. This intermediate circuit component is connected via the third group 5 of the sheet metal sections 2 and likewise comprises suitable receivers for the plugs formed by way of the sheet metal sections 2 of the group 5.

The mechanical fastening of the whole power part component formed in this way is effected usefully via the lateral, sheet metal sections 6 such that the semiconductor component 1 bears directly on the heat distributor in order to lead away the waste heat arising here.

The semiconductor element 1 which here is not described in detail comprises at least the power electronics of the power part, in the present embodiment example however also the rectifier of the input circuit. The bending-up of the free ends of the sheet metal sections may, as the finished cast shape according to FIG. 2 makes clear, be also varied after the casting by way of cold-deformation. It may also be envisaged to correspondingly deform the sheet metal sections before the casting, depending on the arrangement of the further componentries. In any case with such a design of the power part there result numerous possibilities of arranging the components to one another. FIGS. 3a, 3b, and 3c show possible arrangements. With the embodiment according to FIG. 3a the power component lies essentially in the same plane as the intermediate circuit component 11 as well as the control and regulation component 10 which are arranged to both sides of the power component 8. The lead connection to the motor is effected perpendicularly thereto. With the embodiment according to FIG. 3b the circuitboards of the control and regulation circuit 10 as well as of the intermediate circuit 11 are arranged perpendicular to the power part component 8, i.e. to the plane in which the semiconductor element 1 lies. In this manner the frequency convertor may be arranged in a rectangular-parallelpiped-shaped housing.

The arrangement according to FIG. 3c shows how the power part component 8, the control and regulation circuit 10 and the intermediate circuit 11 may be arranged following the outer periphery of the motor housing 12. Also with this embodiment the lead connection is effected via the second group 4 of sheet metal sections 2 perpendicularly downwards to the motor.

As is to be deduced from these arrangements which are not conclusive and are to be understood only as an example, the power part component 8 with its sheet metal sections 2 incorporated into a frame-like cast body 7 allows an inexpensive solution of the electrical and mechanical connection of the individual componentries.

LIST OF REFERENCE NUMERALS

1—semiconductor component
2—sheet metal sections

3—group of sheet metal sections to the control and regulation component
4—group of sheet metal sections to the motor connection
5—group of sheet metal sections to the intermediate circuit component
6—sheet metal sections for the fastening
7—cast body
8—power part component
9—cast body of the group 4
10—control and regulation part
11—intermediate circuit part
12—motor

What is claimed is:

1. A frequency converter for an electric motor, comprising:
   a power part integrated in a common semiconductor component and having a common cast body;
   an intermediate circuit component including a circuit board having at least intermediate circuit electronics;
   a control and regulation component including a circuit board having at least control and regulation electronics; and
   electrical connections connecting said semiconductor component to said circuit board of said intermediate circuit and connecting said semiconductor component to said circuit board of said control and regulation component, said electrical connections comprising a plurality of sheet metal sections positioned and mechanically connected via said common cast body of said power part, wherein said plurality of sheet metal sections comprise electrical leads of said power part.

2. The frequency converter of claim 1, wherein said power part further comprises power leads connectable to the electric motor, said power leads comprising further sheet metal sections arranged in said common cast body.

3. The frequency converter of claim 1, wherein said semiconductor component comprises a parallel-piped component having four sides and said common cast body encompasses at least three sides of said semiconductor component.

4. The frequency converter of claim 1, wherein said common cast body comprises a mounting component arranged such that said entire frequency converter is mountable via said common cast body.

5. The frequency converter of claim 1, wherein at least some of said sheet metal sections have free ends comprising parts of plug-and-socket connections for said electrical connections to at least one of said intermediate circuit component and said control and regulation component.

6. The frequency converter of claim 1, wherein said plural sheet metal sections are formed via an operation including one of a punching operation and a laser cutting operation.

7. The frequency converter of claim 1, wherein said electrical leads of said power part include a group of leads facing said intermediate circuit component arranged on one side of said common cast body and another group of leads facing said control and regulation component on an opposing side of said common cast body.

8. The frequency converter of claim 2, wherein said common cast body defines a two-dimensional rectangular shape having a first lateral side and a second lateral side opposing said first lateral side, said electrical leads of said power part include a group of leads facing said intermediate circuit component arranged on said first lateral side of said common cast body and another group of leads facing said control and regulation component on said second lateral side of said common cast body opposing said first lateral side, and wherein said power leads are led out of one of said first and second lateral sides and bent in a direction approximately 90 degrees to said two-dimensional rectangular shape.

9. The frequency converter of claim 1, wherein said leads of said power part are connected to said semiconductor component via a conductive connection formed via welding.

* * * * *